US012614648B2

(12) United States Patent
Cappella

(10) Patent No.: US 12,614,648 B2
(45) Date of Patent: Apr. 28, 2026

(54) BUSBAR FIXING

(71) Applicant: Intercable Automotive Solutions GmbH, Bruneck (IT)

(72) Inventor: Gianluca Cappella, Bruneck (IT)

(73) Assignee: Intercable Automotive Solutions GmbH, Bruneck (IT)

( * ) Notice: Subject to any disclaimer, the term of this patent is extended or adjusted under 35 U.S.C. 154(b) by 267 days.

(21) Appl. No.: 18/140,082

(22) Filed: Apr. 27, 2023

(65) Prior Publication Data

US 2023/0352211 A1     Nov. 2, 2023

(30) Foreign Application Priority Data

Apr. 29, 2022     (DE) ..................... 10 2022 110 569.5

(51) Int. Cl.
| | |
|---|---|
| *H01B 7/18* | (2006.01) |
| *B60M 1/30* | (2006.01) |
| *H01R 43/24* | (2006.01) |

(52) U.S. Cl.
CPC ............. *H01B 7/183* (2013.01); *B60M 1/302* (2013.01); *H01R 43/24* (2013.01)

(58) Field of Classification Search
CPC ... H01B 7/02; H01B 7/04; H01B 7/06; H01B 7/08; H01B 7/0823; H01B 13/14; H01B 13/144
USPC .... 174/110 R, 110 SR, 112, 120 R, 120 AR, 174/113 R
See application file for complete search history.

(56) References Cited

U.S. PATENT DOCUMENTS

| | | | | |
|---|---|---|---|---|
| 5,533,985 A | * | 7/1996 | Wang | ..................... B29C 48/21 604/525 |
| 6,444,915 B1 | * | 9/2002 | Wang | ..................... H01B 7/06 174/110 R |
| 8,618,413 B2 | * | 12/2013 | Catchpole | ................ H01B 7/24 174/36 |
| 2004/0168820 A1 | * | 9/2004 | Kanamori | .......... C08F 297/083 174/110 R |
| 2006/0131059 A1 | * | 6/2006 | Xu | ......................... H01B 3/427 174/117 F |

(Continued)

FOREIGN PATENT DOCUMENTS

| | | |
|---|---|---|
| CN | 205722867 U | 11/2016 |
| EP | 0809851 A1 | 12/1997 |
| EP | 2624392 B1 | 3/2016 |

(Continued)

OTHER PUBLICATIONS

'Extended European Search Report', European Patent Office, mailed on Sep. 18, 2023, 8 pages.

(Continued)

*Primary Examiner* — William H. Mayo, III
(74) *Attorney, Agent, or Firm* — Billion & Armitage

(57) ABSTRACT

A conductor rail has at least one electrically conductive conductor rail element and an electrically insulating sheath. The electrically insulating sheath includes at least one first component and at least one second component. The at least one first component includes a material having an elastic modulus of greater than or equal to 800 N/mm². The at least one second component includes a material having an elastic modulus of less than or equal to 300 N/mm².

16 Claims, 3 Drawing Sheets

(56) References Cited

U.S. PATENT DOCUMENTS

2010/0044071 A1 * 2/2010 Murao ................ H01B 7/0823
174/116

FOREIGN PATENT DOCUMENTS

| | | |
|---|---|---|
| JP | S5956317 A | 3/1984 |
| JP | H11111068 A | 4/1999 |
| JP | 3700861 B2 * | 9/2005 ............. H01B 13/14 |

OTHER PUBLICATIONS

Office Action for Application No. 102022110569.5; mailed on Jan. 23, 2023; 5 pages.

* cited by examiner

BUSBAR FIXING

CROSS-REFERENCE TO RELATED APPLICATION

This application claims benefit of priority to German Patent Application No. 10 2022 110 569.5 filed on Apr. 29, 2022, the entire disclosure of which is hereby incorporated by reference.

TECHNICAL FIELD

The present disclosure relates to a conductor rail and a method for producing a conductor rail.

BACKGROUND

Conventional conductor rails basically have the problem that their electrically conductive conductor rail elements, e.g., the electrical conductor, and the electrically insulating sheath arranged around the electrically conductive conductor rail elements are provided from different materials, e.g., conductor rail element made of copper (Cu) and sheath made of plastic. The different materials used have different coefficients of thermal expansion during operation, i.e., when currents flow through the conductor rail, then the conductor rail heats up, which leads to the formation of cracks in the electrically insulating sheath. The cracks in the sheath of the electrically conductive conductor rail element can lead to strong reductions in conductivity, e.g., due to corrosion of the conductor rail but also to short circuits, cable fires, injuries to humans and animals.

EP 2 624 392 B1 discloses a busbar. The busbar is provided with a busbar insulator, a busbar conductor, a busbar insulator, a busbar conductor and a busbar insulator, which are formed outside a busbar center. These conductors and insulators are arranged alternately from the inside to the outside in a radial direction, which intersects at right angles with the axial direction of the busbar. The busbar conductors are provided with openings along their entire length in their axial direction.

In this context, it has now been found that there is a need to provide a conductor rail in which the occurrence of cracks in the electrically insulating sheath is reliably prevented, which leads to an improved functionality, a longer service life of the conductor rail and to an increase in the safety of the conductor rail.

It is therefore an object of the present disclosure to provide a conductor rail which has an improved functionality, a longer service life and a higher safety.

SUMMARY

A conductor rail described herein has at least one electrically conductive conductor rail element and an electrically insulating sheath. The electrically insulating sheath has at least one first component and at least one second component. The at least one first component includes a material having an elastic modulus of greater than or equal to 800 N/mm$^2$. The at least one second component includes a material having an elastic modulus of less than or equal to 300 N/mm$^2$.

The term conductor rail is to be understood broadly in the present case and includes all devices which are used in the automotive field, i.e., in e-mobility, for the reliable conduction of electric current between the high-voltage storage device, the control device, the drive and/or the charging unit.

The conductor rail includes an electrically conductive conductor rail element, which consists of an electrically conductive material. Exemplary materials are metals, e.g., copper, copper alloys, aluminum, aluminum alloys. The electrically conductive conductor rail element can be formed in one piece or in multiple pieces. The conductor rail can have any desired three-dimensional shape, e.g., a straight shape, a straight shape with at least one protruding element, a curved shape, or a wavy shape, but is not restricted thereto.

The term sheath is to be understood broadly in the present case and includes all devices or layers which completely surround, envelop, and/or are arranged around the at least one electrically conductive conductor rail element, i.e., except for electrical contact-connection points, or at least partially cover it. The sheath can be arranged in direct contact with or at a distance from the electrically conductive conductor rail element. The sheath can consist of an electrically insulating material but is not restricted thereto. The sheath can be formed in one piece, in multiple pieces, in one layer or in multiple layers. The individual pieces are directly in contact with one another or adjoin one another or can be arranged at a distance from one another in the case of a multiple-piece formation of the sheath. The sheath can consist of a plastic, in particular a halogen-free, non-flammable, hardly flammable and/or flame-retardant material. An advantageous material satisfies the Underwriter's Laboratory retardancy class V0 of the UL 94 flame classification. Exemplary materials are polypropylene and thermoplastic elastomers.

The term component is to be understood broadly in the present case and includes the constituents of the sheath or independent parts/segments/elements which form the multiple-piece sheath. Additionally, or alternatively, the components can be arranged in an overlapping manner.

The use of an electrically insulating sheath which has at least one first component, which includes a material having an elastic modulus of greater than or equal to 800 N/mm$^2$, and at least one second component, which includes a material having an elastic modulus of less than or equal to 300 N/mm$^2$, leads to an increase in the elasticity of the sheath, such that the occurrence of cracks in the sheath can be reliably prevented/suppressed. Therefore, the sheath leads to the conductor rail having an improved functionality, a longer service life and a higher safety.

In a further embodiment of the conductor rail, the at least one electrically conductive conductor rail element has at least two coupling regions and at least one intermediate region, which is arranged between the at least two coupling regions. The intermediate region includes at least one first region and at least one second region. The at least one first region is a region in which mechanical stresses occur, and the at least one second region is a region in which no mechanical stresses occur. The at least one first region includes the at least one second component and the at least one second region includes the at least one first component.

The term coupling region is to be understood broadly in the present case and includes all devices or regions which are used for coupling the conductor rail, in particular the electrically conductive conductor rail element, to a further component, e.g., an electric car. The coupling regions can be electrical connecting regions/connection regions and/or mechanical fastening regions. The coupling regions can have the same shape or different shapes. The coupling regions can be provided from the same material, a different material and/or a different material than that of the electrically conductive conductor rail element. Alternatively, or additionally, the coupling regions, in particular in the contacting regions, can include a surface coating for preventing oxidation and for providing a good electrical connection. Exemplary materials for such a surface coating are tin or nickel.

The term mechanical stress is to be understood broadly in the present case and includes all forces which act on a conductor rail from the outside or from the inside. By means of forces which act from the outside, e.g., stresses occur which are triggered by vibrations, external forces, i.e., impacts, but are not restricted thereto. By means of forces which act from the inside, e.g., stresses occur which arise as a result of the different coefficients of thermal expansion of the materials used but are not restricted thereto.

The term region is to be understood broadly in the present case and includes the first and the second region which are included in the intermediate region which is arranged between the coupling regions. Investigations and long-term analyses of conductor rails show that mechanical stresses occur primarily in regions in which bends or edges of the conductor rails are present. These identified regions, i.e., the regions where mechanical stresses occur, or regions where it is more likely that stresses occur and cracks result therefrom, are classified as the first region. The second region is a region where no mechanical stresses occur, i.e., all regions which are not classified as a first region are classified as the second region.

The use of the at least one second component, i.e., the component with a soft material, in at least one region (first region) in which mechanical stresses occur, and the use of the at least one first component, i.e., the component with a hard material, in at least one region (second region) in which no mechanical stresses occur, leads to an optimized sheath which imparts an improved functionality, a longer service life and a higher safety to the conductor rail.

In a further embodiment of the conductor rail, the at least two coupling regions include the at least one first component of the sheath. The presence of the at least one first component of the sheath in the at least two coupling regions of the conductor rail is to be understood as meaning, of course, that the electrically insulating material of the first component is present only in those regions of the at least two coupling regions which are not used indirectly for transmitting electrical power. Accordingly, the sheath in the at least two coupling regions is present only in regions which are not used as an electrical contact area. These regions which are not used as an electrical contact area can be completely or at least partially sheathed/covered by the at least one first component. This leads to support and reinforcement of the coupling regions. The sheath of the coupling regions is also used to protect the edge regions of the coupling regions. Therefore, a conductor rail can be provided which has an improved functionality, a very longer service life and a higher safety.

In a further embodiment of the conductor rail, the at least one first component and the at least one second component are directly in contact. A contact surface between the at least one first component and the at least one second component has a contoured shape.

The term contoured shape is to be understood broadly in the present case and includes all shapes of a contact surface which have a planar, smooth, perpendicularly extending contact surface and/or deviates from a planar, smooth, perpendicularly extending contact surface. The contoured shape can have a serrated shape, a slope, a step shape, a half-ellipse shape, a pyramid shape, a conical shape and/or a plug shape, but is not restricted thereto. The serrated shape has at least one serration (jag, spike) or hook. The slope has an inclination of the contact surface in an angular range of 1° to 89° and 91° to 179°. The step shape includes at least one step. In the presence of a plurality of steps the step height and the step width can be constant and/or different. The plug shape includes at least one plug element which engages in a complementary recess in the opposite component.

The presence of a contoured shape of the contact surface between the at least one first component and the at least one second component enables an increase in the contact surface, as a result of which an improved functionality, a very longer service life and a higher safety of the conductor rail are provided. Furthermore, the contact strength and tightness of the two components and/or of the sheath can be improved.

In a further embodiment of the conductor rail, the contoured shape of the contact surface has a serrated shape, a slope, a step shape, a straight shape, a half-ellipse shape, a pyramid shape, a conical shape and/or a plug shape.

In a further embodiment of the conductor rail, the material of the at least one first component and/or of the at least one second component includes a halogen-free plastic which satisfies the flame retardancy Underwriter's Laboratory classification of UL 94 V0.

The presence of a halogen-free plastic which satisfies the flame retardancy of Underwriter's Laboratory classification of UL 94 V0 leads to the fact that in the case of a fire of the conductor rail an occurring flame extinguishes within 10 seconds and reignites for a maximum of 30 seconds. The halogen-free nature of the material leads to a low, non-toxic smoke development and fire propagation. Therefore, a higher safety of the conductor rail can be provided.

In a further embodiment of the conductor rail, the material of the at least one first component and the material of the at least one second component are connected to one another.

The term connection is to be understood broadly in the present case and includes any connection possibilities of at least two materials. The connection can represent a complete or at least partial fusion/welding of the material of the at least one first component and of the material of the at least one second component, can represent a form fit, a force fit, a material bond or a combination thereof, but is not restricted thereto.

The presence of a connection between the material of the at least one first component and the material of the at least one second component enables an adhesion between the at least one first component and the at least one second component, as a result of which a gap-free arrangement of the two components can be provided. Therefore, an improved functionality, a very longer service life and a higher safety of the conductor rail can be provided. Furthermore, the insulation capability of the two components and/or of the sheath can be improved.

A method for producing a conductor rail described above has the following steps: providing at least one electrically conductive conductor rail element; applying an electrically insulating sheath on the at least one electrically conductive conductor rail element by means of the following steps: applying at least one first component including a material having an elastic modulus of greater than or equal to 800 N/mm$^2$, and applying at least one second component including a material having an elastic modulus of less than or equal to 300 N/mm$^2$.

The term providing is to be understood broadly in the present case and includes any type and any method for applying materials to one another. Exemplary methods are injection molding methods and/or additive production methods, i.e., 3D printing, with which material, e.g., a plastic, can be applied on a conductor. Furthermore, the term providing includes methods for coating, painting, dipping and/or powder coating, but is not restricted thereto.

In a further embodiment of the method for producing a conductor rail described above, the step of applying the first component is conducted before the step of applying the second component.

The successive provision of the first component and subsequently of the second component leads to the hard component and subsequently the soft component being applied first. This enables a particularly precise configuration of the sheath and in particular of the contact surfaces, since the first applied hard component is used as a stable frame and/or stable shape. Therefore, an improved functionality, a very longer service life and a higher safety of the conductor rail can be provided.

In a further embodiment of the method for producing a conductor rail described above, the applying of the at least first component and/or the at least second component is applied by means of an injection molding method.

BRIEF DESCRIPTION OF THE DRAWINGS

The conductor rail is now described, by way of example with reference to the accompanying drawings, in which.

DETAILED DESCRIPTION

Figure 1:
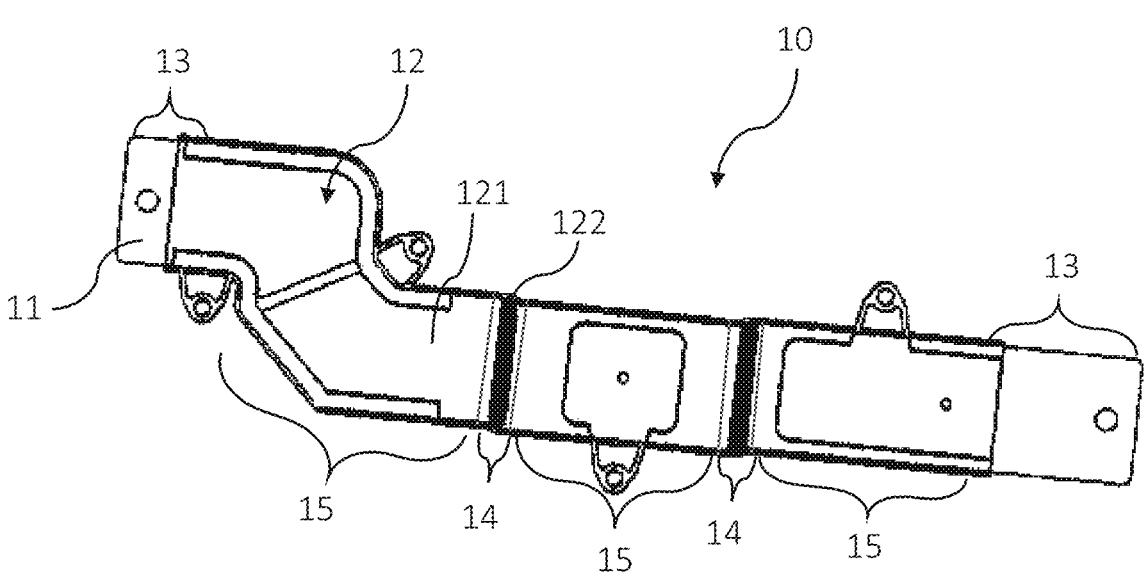
FIG. 1 shows a schematic view of a conductor rail according to some embodiments.

FIG. 1 shows a schematic view of a conductor rail 10. The conductor rail 10 has an electrically conductive conductor rail element 11, which consists of copper, and a sheath 12, which includes a first component 121 made of polypropylene having an elastic modulus of 1300 to 1800 N/mm$^2$ and a second component 122 made of thermoplastic elastomer, TPE, having an elastic modulus of 8.5 N/mm$^2$. The sheath 12 is provided along the entire extension or over the entire length of the conductor rail 10, Only the coupling regions, in particular electrical contacting regions 13 are free of the sheath 12. The second component 122 is arranged in first regions 14, which are present at the bends of the electrically conductive conductor rail element 11, and the first component 121 is arranged in second regions 15, which are present at straight sections or planar sections of the electrically conductive conductor rail element 11.

Figure 2:
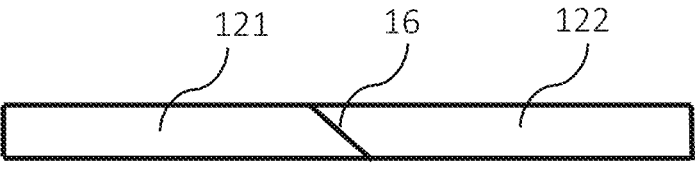
FIG. 2 shows a schematic sectional view of a first embodiment of a contact surface of the at least one first component and of the at least one second component according to some embodiments.

FIG. 2 shows a schematic sectional view of a first embodiment of a contact surface 16 of the at least one first component 121 and of the at least one second component 122. The contact surface 16 is inclined or a slope, wherein the inclination has an angle of 45°.

Figure 3:
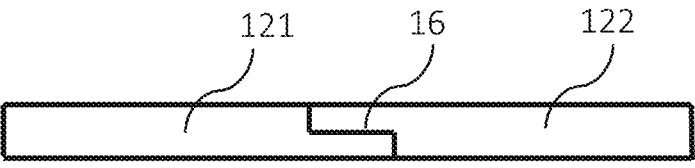
FIG. 3 shows a schematic sectional view of a second embodiment of a contact surface of the at least one first component and of the at least one second component according to some embodiments.

FIG. 3 shows a schematic sectional view of a second embodiment of a contact surface 16 of the at least one first component 121 and of the at least one second component 122. The contact surface 16 is formed in a stepped manner. The stepped formation of the contact surface 16 has a single step.

Figure 4:
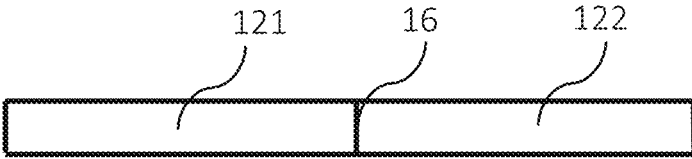
FIG. 4 shows a schematic sectional view of a third embodiment of a contact surface of the at least one first component and of the at least one second component according to some embodiments.

FIG. 4 shows a schematic sectional view of a third embodiment of a contact surface 16 of the at least one first component 121 and of the at least one second component 122. The contact surface 16 is formed perpendicularly and straight.

Figure 5:
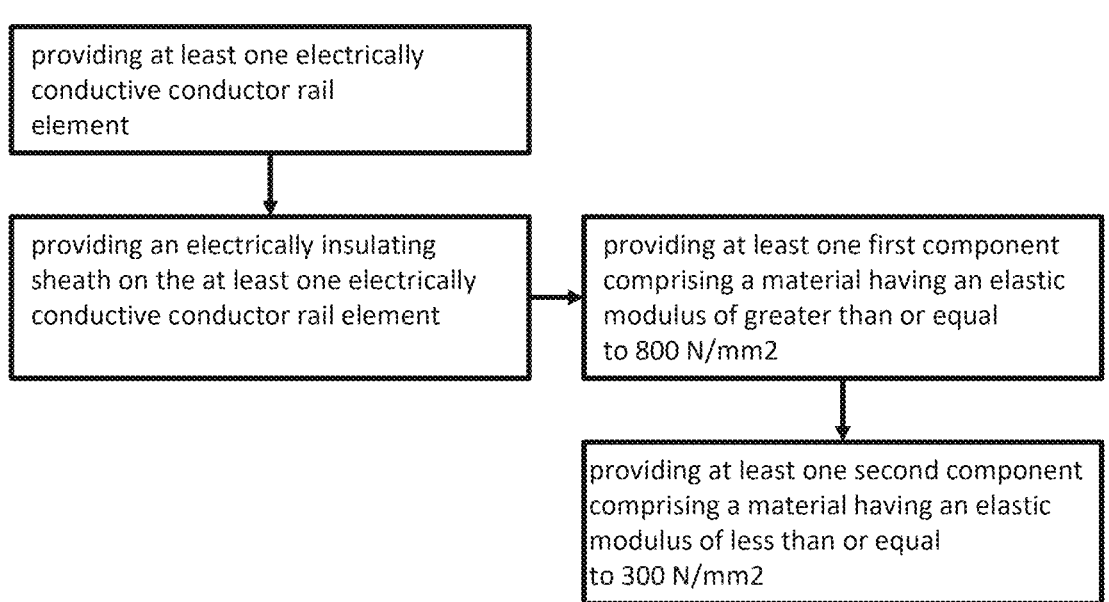
FIG. 5 shows a schematic view of a method for producing a conductor rail according to some embodiments.

FIG. 5 shows a schematic view of a method for producing a conductor rail. The method has the following steps: providing at least one electrically conductive conductor rail element and providing an electrically insulating sheath on the at least one electrically conductive conductor rail element. The electrically conductive conductor rail element is provided in a previous step or method by means of a rolling and punching method or application method of a surface coating at least in the connection regions. The electrically insulating sheath is provided by means of an injection molding method on, in particular directly on, the at least one electrically conductive conductor rail element. The electrically insulating sheath is provided by initially providing or arranging an at least one first component, which includes a material having an elastic modulus of greater than or equal to 800 N/mm$^2$, by means of a first injection molding method on, in particular directly on, regions on which no mechanical stresses act, of the at least one electrically conductive conductor rail. Subsequently, an at least one second component, which includes a material having an elastic modulus of less than or equal to 300 N/mm$^2$, is provided or arranged by means of a second injection molding method on, in particular directly on, regions on which a mechanical stress acts, of the at least one electrically conductive conductor rail and/or on the at least one first component.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes", "including", "includes", and/or "including," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any order of arrangement, order of operations, direction or orientation unless stated otherwise.

The invention claimed is:

1. A conductor rail, comprising:

at least one stiff electrically conductive conductor rail element, wherein the conductor rail element has at least two coupling regions for mechanical fastening, and an intermediate region which is arranged between the at least two coupling regions, wherein the intermediate region comprises at least one first region and at least one second region and the at least one first region is a region in which mechanical stresses occur, and the at least one second region is a region in which no mechanical stresses occur; and an electrically insulating sheath, wherein the electrically insulating sheath comprises at least one first component and at least one second component, wherein the electrically insulating sheath is a multiple piece sheath, wherein the at least one first component comprises a material having an elastic modulus of greater than or equal to 1300 N/mm$^2$, wherein the at least one second component comprises a material having an elastic modulus of less than or equal to 300 N/mm$^2$, and wherein the at least one first component and the at least one second component each comprise independent segments of the multiple piece sheath.

2. The conductor rail according to claim 1, wherein the at least one electrically conductive conductor rail element comprises at least two electrical connection regions and at least one intermediate region which is arranged between the at least two electrical connection regions.

3. The conductor rail according to claim 2, wherein the intermediate region comprises at least one first region and at least one second region.

4. The conductor rail according to claim 3, wherein the at least one first region comprises the at least one second component and the at least one second region comprises the at least one first component.

5. The conductor rail according to claim 2, wherein the two electrical connection regions comprise the first component.

6. The conductor rail according to claim 1, wherein the at least one first component and the at least one second component are directly in contact and wherein a contact surface between the at least one first component and the at least one second component has a contoured shape.

7. The conductor rail according to claim 6, wherein the contoured shape of the contact surface has a serrated shape, a slope, a step shape, a straight shape, a half-ellipse shape, a pyramid shape, a conical shape and/or a plug shape.

8. The conductor rail according to claim 1, wherein the material of the at least one first component and/or of the at least one second component comprises a flame retardant halogen-free plastic.

9. The conductor rail according to claim 1, wherein the material of the at least one first component and the material of the at least one second component are connected to one another.

10. A method for producing a conductor rail including at least one electrically conductive conductor rail element and an electrically insulating sheath, wherein the electrically insulating sheath comprises at least one first component and at least one second component, wherein the at least one first component comprises a material having an elastic modulus of greater than or equal to 1300 N/mm$^2$, and wherein the at least one second component comprises a material having an elastic modulus of less than or equal to 300 N/mm$^2$, said method comprising:

providing at least one stiff electrically conductive conductor rail element with at least two coupling regions for mechanical fastening, and an intermediate region which is arranged between the at least two coupling regions, wherein the intermediate region comprises at least one first region and at least one second region and the at least one first region is a region which is configured for mechanical stresses to occur, and the at least one second region is a region which is configured for no mechanical stresses to occur;

applying an electrically insulating sheath as a multiple piece sheath on the at least one electrically conductive conductor rail element by means of the following steps:

applying at least one first component comprising the material having an elastic modulus of greater than or equal to 800 N/mm$^2$, and applying at least one second component comprising the material having an elastic modulus of less than or equal to 300 N/mm$^2$, wherein the at least one first component and the at least one second component each comprise independent segments of the multiple piece sheath.

11. The method according to claim 10, wherein the step of applying the at least one first component is conducted before the step of applying the at least one second component.

12. The method according to claim 10, wherein the applying of the at least one first component and/or the at least one second component is applied by means of an injection molding method.

13. The conductor rail according to claim 1, wherein the at least one second component comprises a material having an elastic modulus of less than or equal to 50 N/mm$^2$.

14. The conductor rail according to claim 13, wherein the at least one first component comprises a material having an elastic modulus between 1300 N/mm$^2$ and 1800 N/mm$^2$ and wherein the at least one second component comprises a material having an elastic modulus of about 8.5 N/mm$^2$.

15. The method according to claim 10 wherein the at least one second component comprises a material having an elastic modulus of less than or equal to 50 N/mm$^2$.

16. The method according to claim 15, wherein the at least one first component comprises a material having an elastic modulus between 1300 N/mm$^2$ and 1800 N/mm$^2$ and wherein the at least one second component comprises a material having an elastic modulus of about 8.5 N/mm$^2$.

* * * * *